United States Patent Office 3,839,493
Patented Oct. 1, 1974

3,839,493
EPOXY RESIN COMPOSITIONS
Maurice Balme, Sainte-Foy-les-Lyon, Jean Gattus, La Mulatiere, and Bernard Gerard, Lyon, France, assignors to Rhone-Poulenc S.A., Paris, France
No Drawing. Filed June 22, 1972, Ser. No. 265,253
Claims priority, application France, June 24, 1971, 7123066
Int. Cl. C08g 45/06
U.S. Cl. 260—830 P                 13 Claims

ABSTRACT OF THE DISCLOSURE

Heat-curable compositions, which can be cured on heating to give resins having excellent resistance to prolonged heat stresses, are provided, these being obtained by reacting an epoxy resin with a prepolymer possessing imide groups obtained by heating, at between 50° C. and 250° C, a bis-imide of the general formula

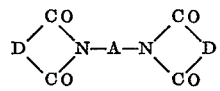

in which D represent a divalent organic radical containing a carbon-carbon double bond and A represents a divalent organic radical possessing 2 to 30 carbon atoms, with a polyamine of the average general formula:

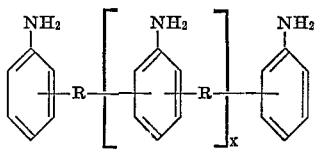

in which $x$ represents a number from approximately 0.1 to 2 and R represents a divalent hydrocarbon radical with 1 to 8 carbon atoms, which is derived from an aldehyde or a ketone of the general formula:

$$O=R$$

in which the oxygen atom is bonded to a carbon atom of the R radical, the number of imide groups provided by the bis-imide being from 1 to 50 per —NH$_2$ group provided by the polyamine.

---

The present invention relates to heat-curable compositions based on epoxy resins.

Various compositions which, according to the proportions and the exact nature of the reagents, can be in the form of more or less viscous liquids or solids with a low melting point, have, for several years now, been sold commercially under the name of "epoxy resins". Typical examples of these compositions are the products of condensation, in an alkaline medium, of epichlorohydrin with organic compounds which possess alcoholic or phenolic hydroxyl groups. These compositions can be cured irreversibly under the influence of heat in the presence of amino or acidic reagents, to give three-dimensional materials which possess noteworthy properties of adhesion, hardness and resistance to chemical agents. These materials, in the form of composite articles, have found a large market in the aeronautics industry.

It is known (see, for example, French Pat. No. 2,045,087) that epoxy resins can be cured by prepolymers produced by heating a N,N'-bis-imide of an unsaturated dicarboxylic acid with a diprimary diamine. The present invention concerns heat-curable compositions comprising the reaction product of an epoxy resin with a prepolymer possessing imide groups. The compositions of the present invention are characterised in that the prepolymer possessing imide groups is one obtained by heating, at between 50° C. and 250° C., a bis-imide of the general formula:

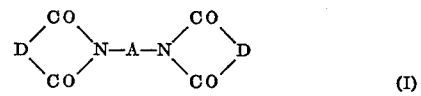

in which D represents a divalent organic radical containing a carbon-carbon double bond and A represents a divalent organic radical possessing 2 to 30 carbon atoms, with a polyamine of the average general formula:

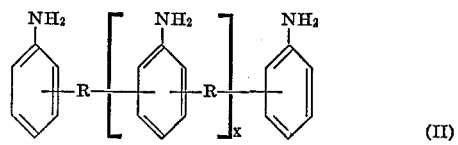

in which $x$ represents a number ranging from approximately 0.1 to 2 and R represents a divalent hydrocarbon radical with 1 to 8 carbon atoms which is derived from an aldehyde or a ketone of general formula:

$$O=R \qquad (III)$$

in which the oxygen atom is bonded to a carbon atom of the R radical, the number of imide groups provided by the bis-imide being from 1 to 50 per —NH$_2$ group provided by the polyamine.

Suitable aldehydes and ketones of formula (III) include formaldehyde, acetaldehyde, benzaldehyde, oenanthaldehyde, acetone, methyl ethyl ketone, 2-hexanone, cyclohexanone and acetophenone.

The polyamines of formula (II) can be produced according to known processes, such as those described in French Pats. Nos. 1,430,977, 1,481,935 and 1,533,696. The crude mixtures of oligomers produced by these processes can be enriched with one or more of their constituents, for example by distillation under reduced pressure.

The symbol D is derived from an ethylenic dicarboxylic acid anhydride of the general formula:

such as maleic anhydride, citraconic anhydride, itaconic anhydride, pyrocinchonic anhydride or dichloromaleic anhydride as well as the Diels-Alder reaction products of one of these anhydrides with an acyclic, alicyclic or heterocyclic diene. As regards the anhydrides which result from a diene synthesis, reference can be made to, for example, volume IV of "Organic Reactions" (John Wiley and Sons, Inc.); tetrahydrophthalic anhydride and endomethylenetetrahydrophthalic anhydride may be mentioned in particular.

The symbol A may, for example, represent a linear or branched alkylene radical having less than 13 carbon atoms, a phenylene radical, a cyclohexylene radical, or a radical of formula:

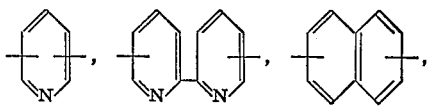

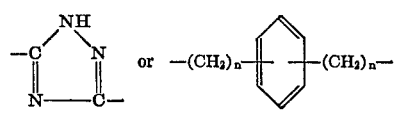

wherein $n$ represents an integer of from 1 to 3. The symbol A can also represent several phenylene or cyclohexylene radicals linked to one another by a simple valency bond or by an inert atom or group such as —O— and —S—, and alkylene group with 1 to 3 carbon atoms, —CO—, —SO$_2$—, —NR$_1$—, —N=N—, —CONH—, —P(O)R$_1$—, —CONH—X—NHCO—,

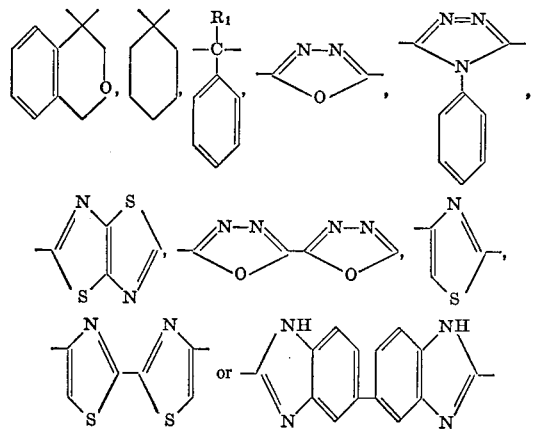

wherein R$_1$ represents a hydrogen atom, an alkyl radical with 1 to 4 carbon atoms, a phenyl radical or a cyclohexyl radical, and X represents an alkylene radical with less than 13 carbon atoms. Furthermore, the various phenylene or cyclohexylene radicals can be substituted by methyl groups.

Specific examples of bis-imides of formula (I) include:

N,N'-ethylene-bis-maleimide,
N,N'-hexamethylene-bis-maleimide,
N,N'-*meta*-phenylene-bis-maleimide,
N,N'-*para*-phenylene-bis-maleimide,
N,N'-4,4'-diphenylmethane-bis-maleimide,
N,N'-4,4'-diphenyl-ether-bis-maleimide,
N,N'-4,4'-diphenyl-sulphone-bis-maleimide,
N,N'-4,4'-dicyclohexylmethane-bis-maleimide,
N,N'-α,α'-4,4'-dimethylene-cyclohexane-bis-maleimide,
N,N'-*meta*-xylylene-bis-maleimide,
N,N'-*para*-xylylene-bis-maleimide,
N,N'-4,4'-diphenylcyclohexane-bis-maleimide,
N,N'-*meta*-phenylene-bis-tetrahydrophthalimide,
N,N'-4,4'-diphenylmethane-bis-citraconimide,
N,N'-4,4'-(1,1-diphenyl-propane)-bis-maleimide,
N,N'-4,4'-(1,1,1-triphenyl-ethane)-bis-maleimide and
N,N'-3,5-(1,2,4-triazole)-bis-maleimide.

These bis-imides can be prepared by, for example, the methods described in U.S. Pat. No. 3,018,290 and British Patent Specification No. 1,137,592. The prepolymers which are preferably used are those in which the bis-imide provides 1.2 to 5 imide groups per NH$_2$ group provided by the polyamine, and the softening point of which is between 100° C. and 200° C. They can be obtained by heating the bis-imide and the polyamine together, until a liquid or paste-like homogeneous mixture is obtained. The temperature used depends on the melting point of the starting reagents but, as a general rule, it is between 80° C. and 180° C. It is advantageous to homogenise the mixture of reagents beforehand. The prepolymers can also be prepared by heating the reagents in a polar solvent such as dimethylformamide, N-methylpyrrolidone, dimethylacetamide, N-methylcaprolactam, diethylformamide or N-acetylpyrrolidone, at a temperature of between 50° C. and 180° C. The prepolymer solutions can be used as they are; alternatively, they can be isolated by precipitation with a diluent which is miscible with the polar solvent and which does not dissolve the prepolymer; water or a hydorcarbon, the boiling point of which does not significantly exceed 120° C., can be used advantageously as the diluent.

The prepolymers can be prepared in the presence of a catalyst consisting of a strong acid. By "strong acid", as used herein is meant, in the Bronsted sense, monoacids or polyacids of which at least one of the acid groups possesses a pKa ionisation constant of less than 4.5. Typical acids include inorganic acids such as hydrochloric, sulphuric, nitric and phosphoric acids, optionally substituted by an organic radical, as in, for example, sulphonic and phosphonic acids. They can also be carboxylic acids. The acid which is preferred is maleic acid. The amounts, by weight, of acid which are generally used represent 0.5 to 5% relative to the weight of the bis-imide (I) employed.

All the usual epoxy resins can be used in the compositions of this invention. Typical examples include glycidyl ethers obtained by reacting, in known manner, polyols such as glycerol, trimethylolpropane, butanediol or pentaerythritol, with epichlorohydrin. Other suitable epoxy resins are glycidyl ethers of phenols such as 2,2-bis-(4-hydroxy-phenyl)-propane, bis - (hydroxy-phenyl)-methane, resorcinol, hydroquinone, pyrocatechol, phloroglucinol, 4,4'-dihydroxy-diphenyl and condensation products of the phenol/aldehyde type. It is also possible to use the products of reaction of epichlorohydrin with the primary or secondary amines such as bis-(4-methyl-amino-phenyl)-methane or bis-(4-amino-phenyl)-sulphone as well as aliphatic or alicyclic polyepoxides resulting from the epoxidation, by means of peracids, of the corresponding unsaturated derivatives. These various types of epoxy resins are now well described in the literature and, for their preparation, reference can, for example, be made to Houben-Weil, volume 14/2, page 462. The epoxy resins in which each molecule possesses at least 2 and preferably more than 3 epoxy groups are of very particular value; amongst the latter, essentially aromatic resins such as the glycidyl ethers of poly(hydroxy-phenyl)alkanes or of phenol-formaldehyde resins as well as to resins of the cycloaliphatic type such as those described in French Pat. No. 1.504.104 are preferred.

The amount of prepolymer can be varied within wide limits; it is usually chosen such that the weight of prepolymer represents from 5% to 90% of the weight of the epoxy resin and prepolymer together. In order to prepare the compositions according to the invention, an intimate mixing of the epoxy resin and the prepolymer can be carried out. According to the physical characteristics of the ingredients, this operation can consist of applying the usual techniques for mixing finely divided solids, or of dissolving or suspending one of the constituents of the mixture in the other while kept in the liquid state, optionally in a solvent such as one of those which are mentioned above for the preparation of the prepolymer, or for example, acetone, ethyl acetate, methylene chloride or methanol.

The mixture of resin and prepolymer can then be heated at a temperature of the order of 50° C. to 200° C. until a liquid or paste-like homogeneous mixture is obtained, which can be used directly, for example shaped by simple casting while hot and then subsequently cured. It is also possible to use this mixture, after cooling and grinding, in the form of a powder which is remarkably suitable for compression-moulding, optionally combined with fibrous or pulverulent fillers. This mixture can also be used in solution for the preparation of laminates, the base of which can be of inorganic or synthetic fibres.

According to a particular method which is advantageous principally for shaping by casting, the prepolymer can be prepared in the epoxy resin itself by heating the mixture of the epoxy resin with the N,N'-bis-imide (I) and the polyamine (II); a variant of this method consists of liquefying the mixture of epoxy resin and N,N'-bis-imide (I) by heating, and then of adding the polyamine (II) to this liquid mixture.

The compositions of this invention can also contain, by way of an adjuvant, an aromatic compound (AR) possessing 2 to 4 benzene rings, which does not sublime at atmospheric pressure up to 250° C. and has a boiling point about 250° C. In these aromatic compounds, the benzene rings can form condensed nuclei or can be linked to one another by a valency bond or by an inert atom or group such as —O—, —CO—, —CH₂—,

—CH—, —C(CH₃)₂—, —CH—, —CH₂—CH₂—,
 |                  |
 CH₃

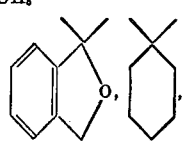, 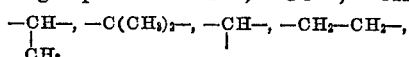, —COO—CH₂—, —COO—, —CO—NH—,

—S—, —SO₂—, —NH—, —N(CH₃)—, —N—, —N=N— and
                                 |

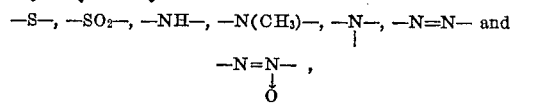

it being understood that in any one compound the overall linkage of the rings can take place through a combination of these different types of linkage. The benzene rings can be substituted by inert radicals such as —CH₃, —OCH₃, —F, —Cl and —NO₂. By way of example, there may be mentioned the terphenyl isomers, chlorinated diphenyls, phenyl ether, 2,2'-naphthyl ether, o-methoxyphenyl ether, benzophenone, 2,5,4'-trimethyl-benzophenone, p-phenyl-benzophenone, p-fluorobenzophenone, diphenylamine, di-phenylmethylamine, triphenylamine, azobenzene, 4,4'-dimethyl-azobenzene, azoxybenzene, diphenylmethane, 1,1-diphenyl-ethane, 1,1-diphenyl-propane, triphenylmethane, diphenyl-sulphone, phenyl-sulphide, 1,2-diphenylethane, p-diphenoxybenzene, 1,1-diphenyl-phthalane, 1,1-diphenyl-cyclohexane, phenyl benzoate, benzyl benzoate, p-nitrophenyl terephthalate and benzanilide. These aromatic adjuvants are suitably used in amounts up to about 10% by weight relative to the weight of the prepolymer (P) or to the weight of the (bis-imide+polyamine) combination. The adjuvant (AR) can be added to the prepolymer (P) or can be introduced during its preparation; it can also be added to the epoxy resin, or to the product of the reaction between the epoxy resin and the prepolymer; again, it can be introduced during the reaction.

The addition of these aromatic compounds gives rise to objects which, after curing, have an even better resistance to prolonged heat stresses; this is particularly noticeable in the case of compression-moulded articles. These adjuvants are also of value for the production of compositions intended to be shaped in the liquid state because they make it possible to extend the period during which the composition can be used in the molten state.

The compositions according to the invention can be cured by heating at temperatures of the order of 150° C. to 300° C., preferably between 180° C. and 280° C.

The compositions according to the invention are particularly valuable in the fields of industry which require materials possessing good mechanical and electrical properties as well as high chemical inertness at temperatures of 220° C. to 300° C. Thus, they are very suitable for the manufacture of plate or tubular insulators for dry transformers, plates for transformer and motor armatures, in printed circuits, panels with a honeycomb-structure and compressor vanes.

The following Examples further illustrate the present invention.

EXAMPLE 1

(a) A prepolymer is prepared by heating a mixture of 71.6 g. of N,N'-4,4'-diphenylmethane-bis-maleimide and 16.3 g. of a polyamine of the average formula:

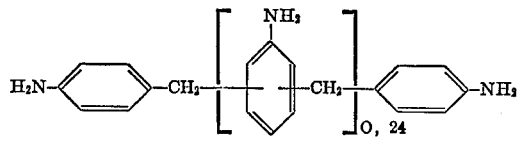

at 170° C. for 13 minutes.

After cooling and grinding, a prepolymer is obtained in the form of a powder, the softening point of which is of the order of 140° C.

(b) 18 g. of an epoxy resin which can be represented by the average formula:

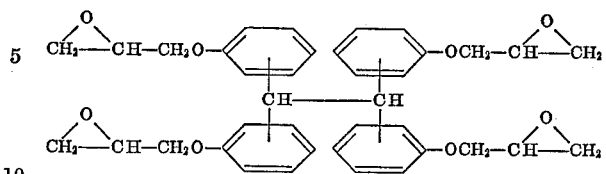

are added to 50 g. of the powder thus obtained. This resin, which contains, on average, 0.459 epoxy group per 100 g. of product, is sold commercially under the name "Epon 1031."

A composition is prepared by mixing the ingredients (a) and (b) intimately and then heating the mixture for 15 minutes at 160° C. After cooling, the residue obtained is ground; 25 g. of powder are removed and introduced into a cylindrical mould (diameter 7.6 cm.). The mould is placed between the platens of a press which has previously been heated to 250° C. and it is held at this temperature for 1 hour under a pressure of 200 bars. After removal from the mould while hot and after cooling, the object has a flexural breaking strength at 25° C. of 12.3 kg./mm.². After 560 hours at 250° C., this strength is still 12.5 kg./mm.².

EXAMPLE 2

8.2 g. of the epoxy resin used in Example 1, 60 g. of N,N'-4,4'-diphenylmethane-bis-maleimide and 13.5 g. of a polyamine of the average formula:

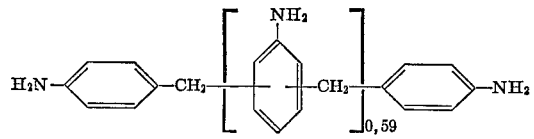

are introduced into a container surrounded by a fluid heated to 160° C. When the mixture begins to melt, it is stirred and is kept under these conditions for 10 minutes. The liquid mixture is then cast in a parallelepiped mould (125 mm. x 75 mm. x 6 mm.), the internal walls of which have a silicone resin coating, the mould having previously been heated to 200° C.

The whole is left for 24 hours at this temperature and is then removed from the mould while hot. The moulded object is subjected to an additional heat treatment for 24 hours at 250° C. It then has a flexural breaking strength of 10 kg./mm.² (measured at 25° C.) and 9.8 kg./mm.² (measured at 250° C.). After 560 hours at 250° C., this strength is 10.8 kg./mm.² (measured at 25° C.) and 8.5 kg./mm.² (measured at 250° C.).

EXAMPLE 3

30 g. of an epoxy resin of cycloaliphatic type sold commercially under the name "Epikote 171" and containing 0.75 epoxy group in 100 g. of product, 60 g. of N,N'-4,4'-diphenylmethane-bis-maleimide and 13.5 g. of a polyamine identical to that used in Example 2 are introduced into a container surrounded by a fluid heated to 150° C. When the mixture begins to melt, it is stirred and kept under these conditions for 15 minutes. The liquid mixture is then cast in the parallelepiped mould used in Example 2 which has previously been heated to 200° C.

The whole is left for 24 hours at this temperature and is then removed from the mould while hot. The moulded object is subjected to an additional heat treatment for 24 hours at 250° C. It then has a flexural breaking strength of 11.7 kg./mm.² (measured at 25° C.) and 5.7 kg./mm.² (measured at 250° C.). After 560 hours at 250° C., this strength is still 13.1 kg./mm.² (measured at 25° C.) and 5.3 kg./mm.² (measured at 250° C.).

EXAMPLE 4

40 g. of an epoxy resin of cycloaliphatic type sold commercially under the name "Epikote 173" and containing 0.53 epoxy group in 100 g. of product, 40 g. of N,N'-4,4'-diphenylmethane-bis-maleimide and 9 g. of a polyamine identical to that in Example 2 are mixed at 150° C. This mixture is moulded by casting it under the conditions described in Example 2.

The moulded object has a flexural breaking strength at 25° C. of 12.1 kg./mm.² After 560 hours at 250° C., this strength is still 7.9 kg./mm.²

EXAMPLE 5

60 g. of an epoxy resin which can be represented by the average formula:

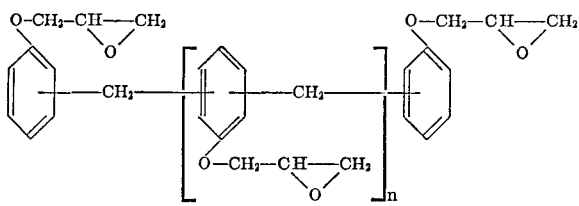

containing, on average, 0.556 epoxy group per 100 g. of product and sold commercially under the name "Epikote 154," 30 g. of N,N'-4,4'-diphenylmethane-bis-maleimide and 6.75 g. of a polyamine identical to that used in Example 2 are mixed at 130° C. This mixture is moulded by casting it under the conditions described in Example 2.

The moulded object has a flexural breaking strength at 25° C. of 13.4 kg./mm.² After 560 hours at 250° C., this strength is still 13.5 kg./mm.²

We claim:

1. A heat-curable composition obtained by reacting an epoxy resin containing at least two epoxy groups per molecule with a prepolymer possessing imide groups obtained by heating, at between 50° C. and 250° C., a bis-imide of the general formula:

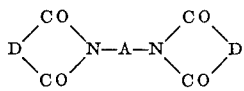

in which D represents a divalent organic radical containing a carbon-carbon double bond and A represents a divalent organic radical possessing 2 to 30 carbon atoms, with a polyamine of the average general formula:

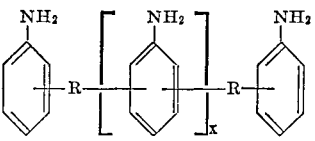

in which x represents a number from approximately 0.1 to 2 and R represents a divalent hydrocarbon radical with 1 to 8 carbon atoms, which is derived from an aldehyde or a ketone of the general formula:

O=R in which the oxygen atom is bonded to a carbon atom of the R radical, the number of imide groups provided by the bis-imide being from 1 to 50 per —NH₂ group provided by the polyamine, said prepolymer representing from 5 to 90% by weight of the prepolymer and epoxy resin.

2. A composition according to Claim 1 in which the prepolymer is obtained from a bis-imide providing 1.2 to 5 imide groups per —NH₂ group provided by the polyamine.

3. A composition according to Claim 2 in which the prepolymer has a softening point of between 100° C. and 200° C.

4. A composition according to Claim 1 in which A represents a diphenylmethylene group.

5. A composition according to Claim 1 in which D represents the radical —CH=CH—.

6. A composition according to Claim 1 in which R is derived from formaldehyde, acetaldehyde, benzaldehyde, oenanthaldehyde, acetone, methyl ethyl ketone, 2-hexanone, cyclohexanone or acetophenone.

7. A composition according to Claim 1 in which the epoxy resin is a glycidyl ether obtained from a polyol or phenol and epichlorohydrin, having more than 3 epoxy groups per molecule.

8. A composition according to Claim 1 which also contains an aromatic compound having 2 to 4 benzene rings, which does not sublime at atmospheric pressure up to 250° C. and has a boiling point above 250° C.

9. Process for preparing a composition as defined in Claim 1 which comprises heating a mixture of the prepolymer and epoxy resin, the prepolymer representing from 5 to 90% by weight of the prepolymer and epoxy resin, at a temperature of 50° to 200° C. until a liquid or paste-like homogeneous mixture is obtained.

10. Process according to Claim 9 in which the prepolymer is prepared *in situ* in the epoxy resin by heating the bis-imide, polyamine and epoxy resin.

11. A process for preparing a cured resin which comprises heating a composition as defined in Claim 1 at a temperature of 150° to 300° C.

12. A process according to Claim 11 in which the composition is heated at a temperature of 180° to 280° C.

13. A cured resin prepared by a process as defined in Claim 12.

References Cited

UNITED STATES PATENTS

| | | | |
|---|---|---|---|
| 3,416,994 | 12/1968 | Chalmers | 260—830 P |
| 3,429,947 | 2/1969 | Eygen | 260—836 |
| 3,494,979 | 2/1970 | Pratt | 260—836 |
| 3,663,651 | 5/1972 | Traut | 260—830 P |
| 3,763,087 | 10/1973 | Holub | 260—836 |
| 3,766,302 | 10/1973 | Holub | 260—836 |

FOREIGN PATENTS 2,045,087  2/1971  France.

PAUL LIEBERMAN, Primary Examiner

U.S. Cl. X.R.

260—78 UA, 834, 836, 837